United States Patent [19]

Andersen

[11] Patent Number: 4,709,836
[45] Date of Patent: Dec. 1, 1987

[54] FLUID FLOW NOZZLE

[75] Inventor: Arve Andersen, Krokstadelva, Norway

[73] Assignee: Elopak A/S, Norway

[21] Appl. No.: 852,533

[22] Filed: Apr. 16, 1986

[30] Foreign Application Priority Data

Apr. 16, 1985 [GB] United Kingdom ............. 8509712

[51] Int. Cl.⁴ .................................................. B65D 5/72
[52] U.S. Cl. ................................... 222/490; 222/494;
 222/515; 222/556; 222/567; 137/847; 141/392
[58] Field of Search .............. 222/494, 515, 517, 556,
 222/567, 491, 490, 213, 570, 574; 137/846, 847;
 239/533.13, 533.15; 193/20, 21, 32; 141/392, 67

[56] References Cited

U.S. PATENT DOCUMENTS

| 854,792 | 5/1907 | Bartlett | 222/570 X |
| 3,191,820 | 6/1965 | Kuster | 222/490 |
| 3,595,266 | 7/1971 | Brookman | 137/847 X |
| 3,726,436 | 4/1973 | Despain et al. | 222/494 X |
| 3,773,233 | 11/1973 | Sousa | 222/490 |
| 4,109,836 | 8/1978 | Falarde | 222/494 |
| 4,139,124 | 2/1979 | Ferrante | 222/110 |
| 4,454,967 | 6/1984 | Carr | 222/494 X |
| 4,524,805 | 6/1985 | Hoffman | 137/847 X |
| 4,585,031 | 4/1986 | Raftis et al. | 137/847 X |

FOREIGN PATENT DOCUMENTS 2095584 10/1982 United Kingdom ............... 137/846

Primary Examiner—Joseph J. Rolla
Assistant Examiner—Gregory L. Huson
Attorney, Agent, or Firm—Pravel, Gambrell, Hewitt, Kimball & Krieger

[57] ABSTRACT

A one-piece, resilient nozzle on an outlet pipe of a carton filler includes two relatively rigid flaps at opposite sides of the nozzle and two relatively flexible walls at other opposite sides of the nozzle, to form with the flaps a loop encircling the nozzle interior. The flaps are biassed, by the inherent resilience of the nozzle, about an axis perpendicular to the nozzle and parallel to linear bottom edges of the flaps into a closed position wherein those edges come together along a linear zone at the base of a downwardly converging interior space bounded by the loop.

10 Claims, 5 Drawing Figures

FLUID FLOW NOZZLE

BACKGROUND OF THE INVENTION

1. Field of the Invention

This invention relates to a fluid flow nozzle, in particular to a filling nozzle of a machine for filling containers with liquid.

2. Description of the Prior Art

In the manufacture of certain types of non-returnable packages for dairy products, the packaging containers are filled with the help of metering pumps. Such pumps at each pumping stroke meter out the desired amount of liquid to a chamber whence the liquid is transferred to the container to be filled.

In order to prevent after-dripping between pumping strokes, it is known from British Patent Specification No. 2095584 for a filler to include a non-return valve and a flexible nozzle having a cruciform slit which is normally urged closed by the flexibility of the material. The non-return valve, with the aid of a piston component thereof, after the completed pumping stroke, creates a suction on the liquid in the nozzle, so that the nozzle is closed more rapidly and effectively than it would be if its closing were to rely simply upon the flexibility of its material. The cruciform slit of this flexible nozzle gives a number of disadvantages. Firstly, it does not reliably seal, particularly at its centre. Secondly, in the open condition of the nozzle, the lips of the outlet mouth of the nozzle adopt a zig-zag form as viewed perpendicularly to the axis of the nozzle, so that, in filling the bottom of a carton, foaming and splashing can occur owing to the tops of the zig-zags being above the liquid level, and, in filling the remainder of the carton, either this foaming or splashing continues to occur, or the nozzle has to be dipped to a sufficient extent into the liquid to ensure that all of each zig-zag is below the surface of the liquid.

A liquid dispensing container having a flexible nozzle is disclosed in U.S. Pat. No. 4,139,124. The container consists of a cup and a cover. The cup contains the liquid, whilst the cover is provided with a pressure controlled flexible nozzle which is opened and closed by applying and releasing pressure on a resiliently flexible wall part of the cover opposite the flexible nozzle. An increase of pressure within the container by pressure on the flexible wall part causes automatic opening of the flexible nozzle, whilst a decrease of pressure in the container causes the nozzle to close. A collection spout surrounds the flexible nozzle and any dripping of liquid occurring when the contents of the container are being dispensed is collected in the spout and forced back into the container through a valve-controlled orifice when pressure on the flexible wall part is released. The specification discloses various forms of nozzle mouth in its closed condition. Among these are a curciform slit and a slit which is linear with forked ends. The resilient walls of the nozzle are provided with resilient beads which are integrally joined at one end to the cover and which lie on the outside of the resilient sheet material of the nozzle whilst extending along the nozzle. This nozzle is not designed to contain liquid continually and for that reason liquid-tight sealing at the mouth of the nozzle in the closed condition is not vital, as it is with a carton filling machine. In practice, the use of the beads within folds of the resilient nozzle material makes it difficult to obtain liquid-tight sealing.

Particularly on high-speed fillers, it is important to minimize the problems of splashing and foaming on injection.

SUMMARY OF THE INVENTION

According to one aspect of the present invention, there is provided a fluid flow nozzle having an inlet end region and outlet end region and comprising first and second relatively rigid flaps arranged facing each other at respective first and second opposite sides of the nozzle, and first and second relatively flexible walls arranged among the flaps and facing each other at respective third and fourth opposite sides of the nozzle and each having opposite edge zones thereof attached to respective edge zones of the respective flaps so as to form with the flaps a loop encircling the nozzle interior, a ring at said inlet end region and peripherally co-extensive with said loop and mounting said loop said first flap being so mounted upon said ring as to turn, about an axis of turning transverse to a longitudinal axis of the nozzle and substantially parallel to respective linear outer edges of the flaps, between an open position and a closed position in which closed position said outer edges come together along a linear zone at the base of an interior space bounded by said flaps and converging towards said linear zone and the walls close off said interior space at said third and fourth sides and each wall extends from said respective edge zone of the respective flap toward said longitudinal axis, and said first flap being biassed into the closed position against the action of any fluid supplied under pressure to the nozzle.

BRIEF DESCRIPTION OF THE DRAWINGS

A major advantage of this nozzle is that the use of two relatively rigid flaps biassed together to give a linear sealing zone in the closed condition avoids the use of beads which detract from the sealing effect, and also avoids the sealing, splashing and foaming problems associated with a cruciform sealing zone.

In order that the invention may be clearly understood and readily carried into effect, reference will now be made, by way of example, to the accompanying drawings, in which.

DESCRIPTION OF THE PREFERRED EMBODIMENT

Figure 1:
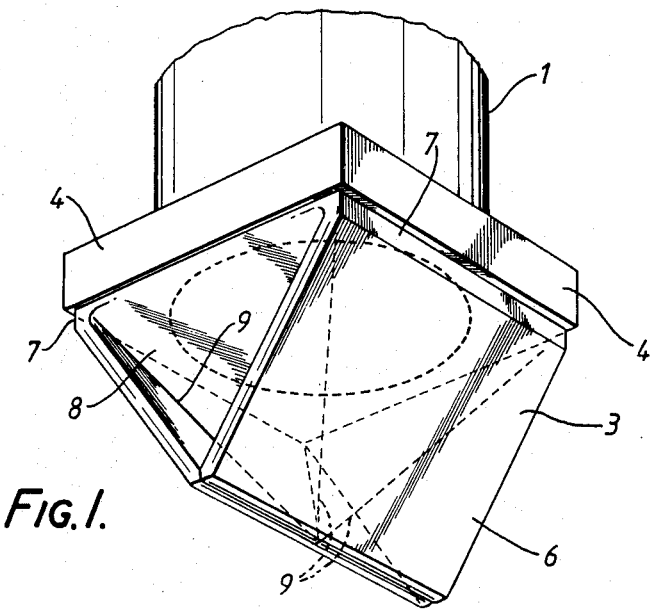
FIG. 1 is an underneath perspective view of a flexible nozzle mounted on an outlet pipe of a carton filler, with the nozzle being shown in its closed condition.

Referring to the drawings, the filler includes an outlet pipe 1 of which the outlet mouth 2 has a vertical axis A. Mounted upon the pipe 1 so as to close the mouth 2 is a nozzle 3 which is moulded in one piece of resiliently flexible material, for example of silicone rubber of a hardness of about 50° Shore. The nozzle 3 includes a top ring 4 having the axis A and of square external peripheral outline and circular internal peripheral outline which fits sealingly round the outlet end of the pipe 1.

To retain the nozzle 3 reliably on the pipe 1, the ring 4 is formed with an inwardly projecting annular flange 5 engaging in a complementary groove in the external periphery of the pipe 1. The internal profile of the ring 4 and the degree of resilient flexibility of the nozzle material are such that it is not necessary to use any clamping device to attach the nozzle 3 to the pipe 1.

The nozzle 3 includes two flaps 6 which are of sufficient thickness as to be relatively rigid. Each flap 6 is of rectangular outline and its upper edge is connected to a parallel side of the ring 4 by a thin web 7 constituting a hinge, whereby the flap 6 is turnable about a horizontal axis. The flaps 6 are arranged at respective opposite sides of the nozzle 3 and their axes of turning (7) are parallel to each other. The nozzle 3 also includes two walls 8 arranged among the flaps 6 so as to constitute with them a loop encircling the nozzle interior. Each wall 8 is relatively flexible. For this purpose, it is provided with downwardly converging lines of weakness 9 and also is made relatively thin. In this respect, it is about one quarter of the thickness of each flap 6, being for example, 0.7 mm. thick, compared to 2.5 mm. thickness of the flap. The lines 9 effectively divide their wall 8 into three triangular panels, of which the two referenced 8a are of substantially right-angle triangular form and each connected along one edge to the adjacent flap 6, whilst the panel referenced 8b is of an isosceles triangular form with its top edge connected to an adjacent side of the ring 4.

Figure 3:
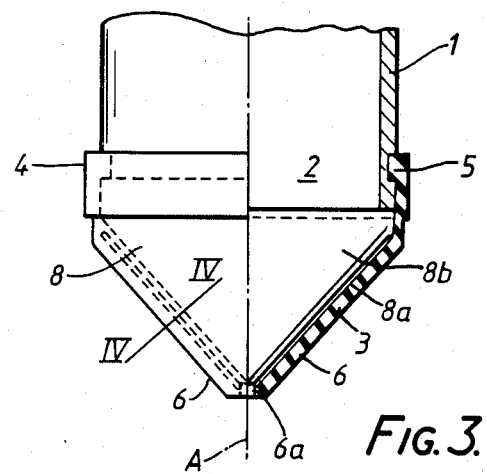
FIG. 3 is a view, half in elevation and half in vertical axial section, of the nozzle and the pipe shown in FIG. 1.
Figure 4:
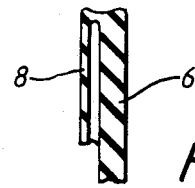
FIG. 4 shows a section taken along the line IV—IV of FIG. 3.
Figure 5:
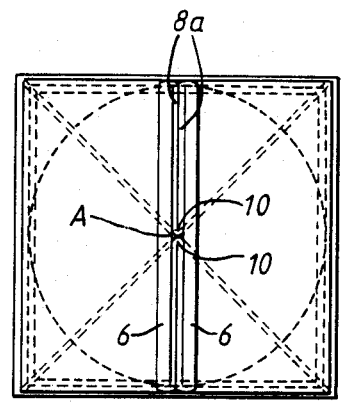
FIG. 5 is an underneath plan view of the nozzle in its closed condition.

The nozzle 3 is produced in such a manner that, in the absence of external forces, it occupies the sealingly closed position shown in FIGS. 1, 3 and 5.

In the closed condition of the nozzle, the bottom edge zones of the panels 8a are sandwiched between the bottom edges of the flaps 6, the vertices 10 of the walls 8 also being pressed together, so that there is a liquid-tight seal over the whole of the lowermost extremity of the nozzle 3, whereby the liquid contained in the interior of the nozzle 3 and the pipe 1 cannot drip from the nozzle. In order to maximize the sandwiching effect, the flaps 6 are formed with surfaces 6a which, in the closed condition, are vertical and bear directly upon the panels 8a. Upon a pumping device (not shown) upstream of the pipe 1 beginning to displace that liquid downwards, with the nozzle 3 extending down to the bottom of the interior of a rectangular-section carton to be filled, the pressure of the liquid upon the panels 8b and upon the flaps 6 presses the walls 8 and the flaps 6 outwards against their inherent resilience, until the nozzle reaches its fully open position shown in FIG. 2, in which the bottom edges of the flaps 6 and the walls 8 are at substantially the same horizontal level, so that the nozzle 3 need be only slightly dipped into the liquid in the carton to avoid foaming. As the flow of liquid through the nozzle 3 ceases, the nozzle 3 closes under its own resilience back into the condition shown in FIG. 1.

The flaps 6 are made relatively rigid since, if they were made relatively flexible, and when suction is used as a further aid towards preventing dripping, the pressure of the ambient air would depress the flaps 6 and tend to squeeze the liquid out downwardly, so tending to result in dripping. The walls 8 are made relatively flexible since then the nozzle can open widely with relatively little pressure upon the liquid in the nozzle, thus minimizing the opening pressure required and thereby minimizing foaming. An advantage of having the nozzle of square rectangular section externally and internally is that, not only will it be more complementary to the carton than a round nozzle and thus help in minimizing splashing to outside the carton, but it will allow a greater flow rate than would be allowed by a circular-section nozzle inserted into the same size of carton.

The hinging of the flaps 6 to the ring 4 and to the walls 8 by means of thin webs of material gives easy and smooth opening and closing of the flexible nozzle, so that it is easy to obtain a relatively large nozzle outlet with correspondingly low liquid flow rate, and also liquid-tight closing when the filling stops.

Figure 2:
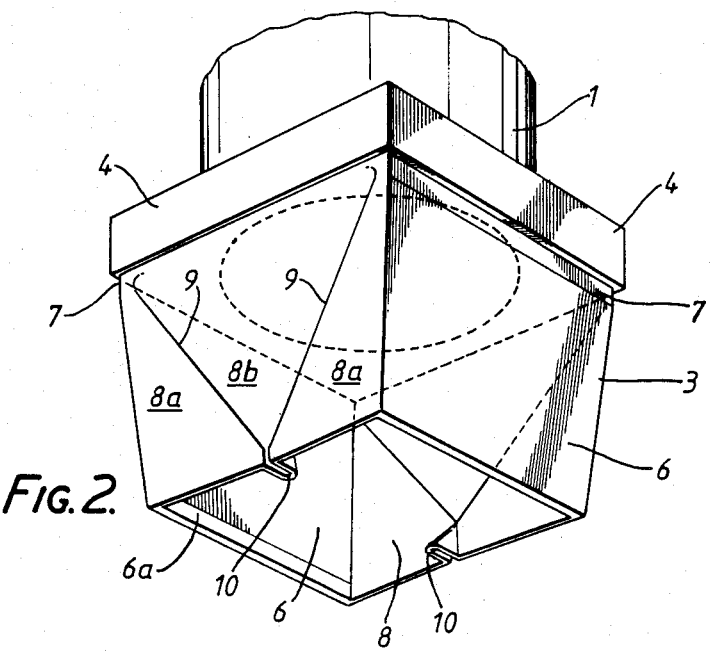
FIG. 2 is a view similar to FIG. 1 but showing the nozzle in its fully open condition.

It should also be noted that, in the open condition shown in FIG. 2, the walls 8 protrude somewhat inwards towards each other. This has the advantage that they tend to divide the liquid stream to permit air to escape out of the container without any significant air inclusion.

The present nozzle also has the advantage that it can be used in packing liquids of a very wide range of viscosities and of a very wide range of consistencies, for example from skimmed milk to thick cream to yoghurt with cherries.

I claim:

1. A fluid flow nozzle having an inlet end region and outlet end region and comprising:
    first and second relatively rigid flaps arranged facing each other at respective first and second opposite sides of the nozzle;
    first and second relatively flexible walls arranged between the flaps and facing each other at respective third and fourth opposite sides of the nozzle and each having opposite edge zones thereof attached to respective edge zones of the respective flaps so as to form with the flaps a loop encircling the nozzle interior;
    a ring at said inlet end region and peripherally coextensive with said loop and mounting said loop;
    said first flap being so mounted upon said ring as to turn relative to said second flap, about an axis of turning transverse to a longitudinal axis of the nozzle and substantially parallel to respective linear outer edges of the flaps, between an open position and a closed position in which closed position said outer edges come together along a linear zone at the base of an interior space bounded by said flaps and converging towards said linear zone and the walls close off said interior space at said third and fourth sides and each wall extends from said respective edge zone of the respective flap toward said longitudinal axis; and
    said first flap being biassed into the closed position against the action of any fluid supplied under pressure to the nozzle.

2. A nozzle according to claim 1, wherein said second flap is also so mounted as to turn, about a second axis of turning substantially parallel to the axis of turning of the first flap, between an open position and a closed position in which closed position said outer edges come together along said linear zone, said second flap being biassed into its closed position against the action of any fluid supplied under pressure to the nozzle.

3. A nozzle according to claim 1, wherein each wall is provided with two converging lines of weakness which define three triangular panels of the wall, of which two are of substantially right-angle triangular form and each connected along one edge to an adjacent said flap, whilst the other is of a substantially isosceles triangular form with its apex at the outlet end of said nozzle.

4. A nozzle according to claim 1, wherein said loop is of a substantially square rectangular section externally and internally in an open condition of said loop.

5. A nozzle according to claim 1, wherein said walls protrude somewhat towards each other in an open condition of said loop.

6. A nozzle according to claim 1, wherein said ring is formed with an inwardly projecting annular flange for engaging sealingly in an annular groove in the external periphery of a pipe.

7. A nozzle according to claim 1, wherein said ring is of substantially square external peripheral outline.

8. A nozzle according to claim 1 and formed of a resilient material, said flaps being relatively thick so as to be relatively rigid and said walls being relatively thin so as to be relatively flexible.

9. A nozzle according to claim 8, wherein the thickness of each wall is about one quarter of the thickness of each flap.

10. A nozzle according to claim 8 and further including a first relatively thin web whereby said first flap is so mounted upon said ring as to turn about said axis of turning.

* * * * *